United States Patent [19]
Morishita et al.

[11] Patent Number: 5,067,415
[45] Date of Patent: * Nov. 26, 1991

[54] TRANSPORTING SYSTEM OF FLOATED CARRIER TYPE WITH ZERO POWER CONTROL AT VARYING LOAD WEIGHTS

[75] Inventors: Mimpei Morishita; Teruo Azukizawa, both of Tokyo, Japan

[73] Assignee: Kabushiki Kaisha Toshiba, Kawasaki, Japan

[ * ] Notice: The portion of the term of this patent subsequent to Jun. 13, 2006 has been disclaimed.

[21] Appl. No.: 528,752

[22] Filed: May 25, 1990

Related U.S. Application Data

[63] Continuation of Ser. No. 36,175, Apr. 8, 1987, which is a continuation of Ser. No. 726,975, Jun. 25, 1985, abandoned.

[30] Foreign Application Priority Data

Oct. 23, 1984 [JP] Japan ................... 59-222702
Jan. 22, 1985 [JP] Japan ................... 60-9774

[51] Int. Cl.$^5$ ............................................ B60L 13/04
[52] U.S. Cl. ....................... 104/281; 104/284; 104/286
[58] Field of Search ............ 104/48, 128, 129, 281, 104/286, 289, 290, 292, 293, 294, 295, 296, 302, 303, 307, 249; 318/135

[56] References Cited

U.S. PATENT DOCUMENTS

| | | | |
|---|---|---|---|
| 3,736,880 | 6/1973 | Ross | 318/135 X |
| 3,836,799 | 9/1974 | Eastham et al. | 104/282 X |
| 3,847,089 | 11/1974 | Nelson | 104/293 |
| 3,899,979 | 8/1975 | Godsey, Jr. | 104/283 |
| 3,912,991 | 10/1975 | Moyse | 104/292 |
| 3,927,620 | 12/1975 | Clapham | 104/282 |
| 3,937,148 | 2/1976 | Simpson | 104/283 |
| 4,055,123 | 10/1977 | Heidelberg | 104/283 |
| 4,140,063 | 12/1979 | Nakamura | 104/284 |
| 4,419,937 | 12/1983 | Steinmetz et al. | 104/281 |
| 4,505,206 | 3/1985 | Gottzein et al. | 104/284 |

FOREIGN PATENT DOCUMENTS 0018115 2/1978 Japan ................... 104/281
1457262 12/1976 United Kingdom .

*Primary Examiner*—Robert J. Oberleitner
*Assistant Examiner*—S. Joseph Morano
*Attorney, Agent, or Firm*—Oblon, Spivak, McClelland, Maier & Neustadt

[57] ABSTRACT

In a transporting system for transporting cargo to a predetermined position, a carrier is located above rails and a first support plate is located under the rail and is coupled with the carrier by a pair of columns. A second support plate is rotatably coupled by a coupling mechanism. Four magnetic floating assemblies are so disposed on the first and second plates as to face the rails and a control unit is disposed on the first support plate. The carrier is floated by an attractive force produced between the rail and the magnet units of the assemblies. A gap sensor of each of the assemblies generates an output signal corresponding to a gap between the rails and the magnet unit and a current supplied to the magnet unit is also detected by a current detector. The outputs from the gap sensor and the current detector is fed as feedback signal to an operational circuit of the control unit. Thus, the current supplied to the magnet unit is so adjusted by the operational circuit as to supply the current when an external force is applied to the carrier.

12 Claims, 11 Drawing Sheets

F I G. 10
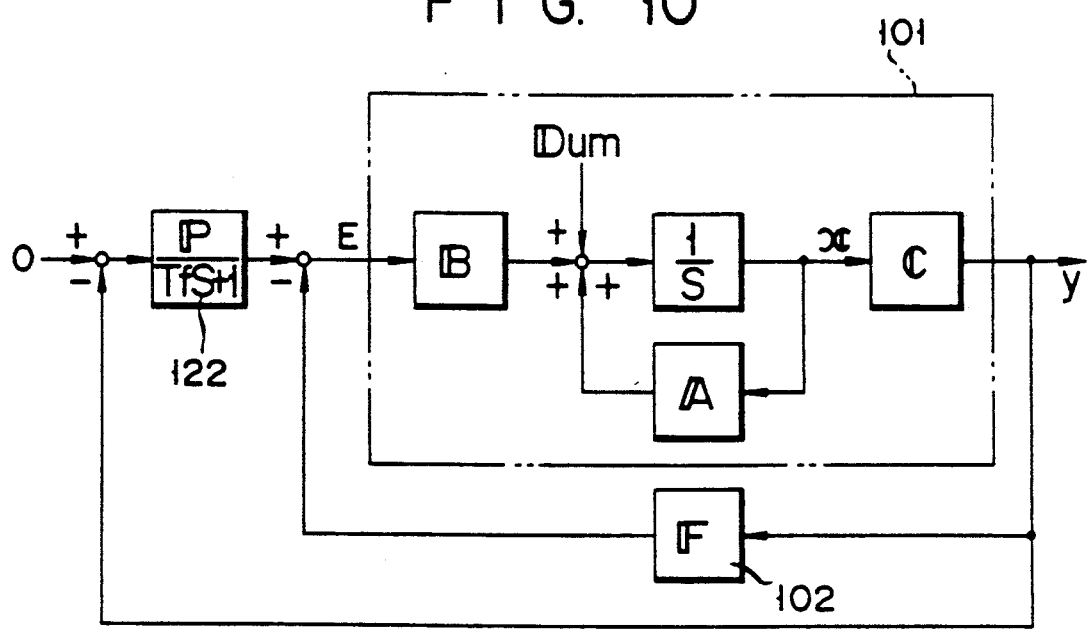
F I G. 11
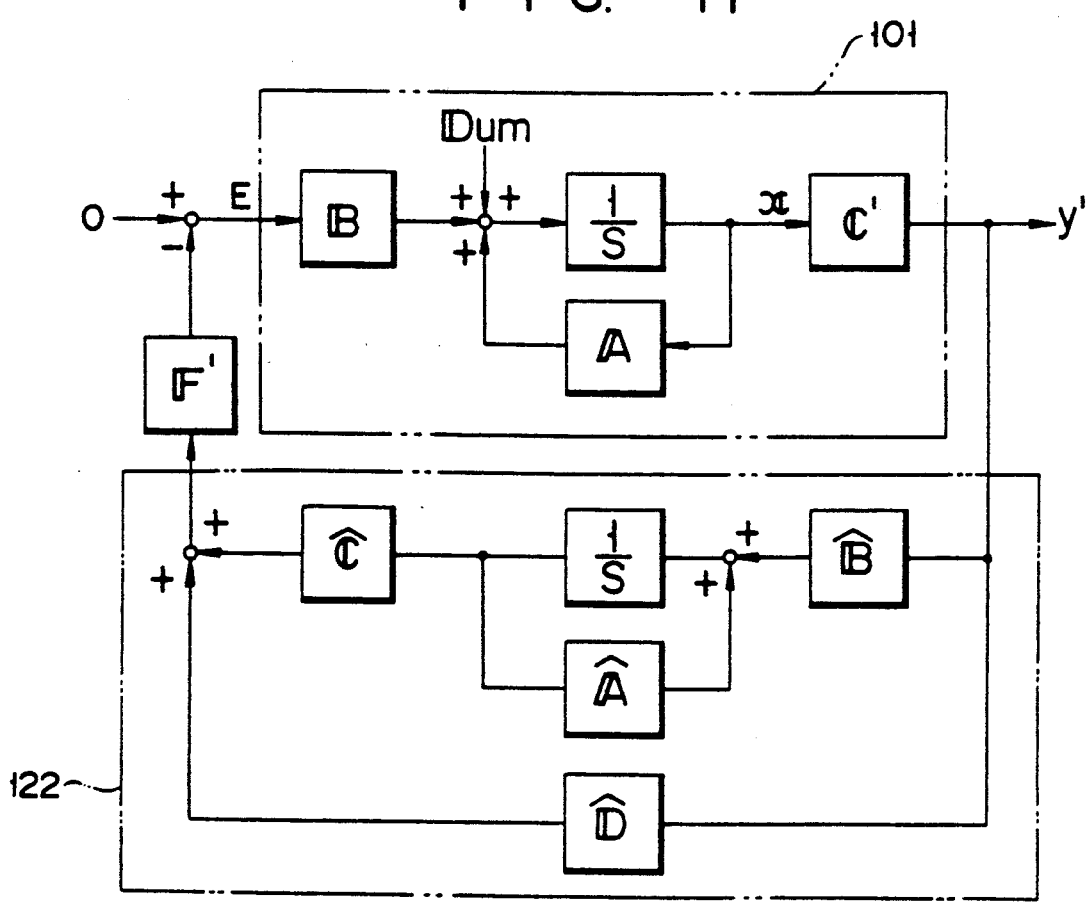

F I G. 14
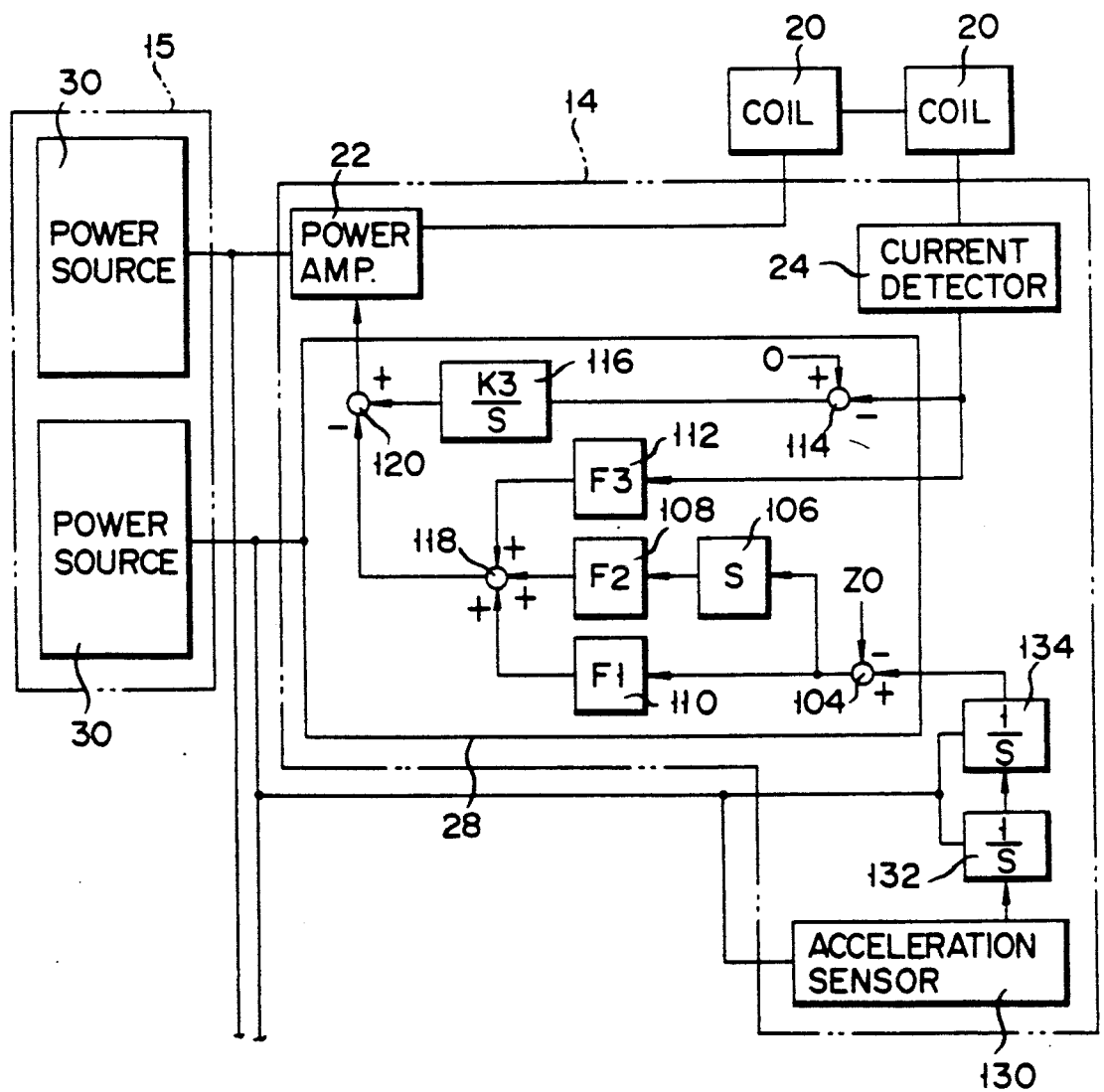

TRANSPORTING SYSTEM OF FLOATED CARRIER TYPE WITH ZERO POWER CONTROL AT VARYING LOAD WEIGHTS

This is a continuation of application Ser. No. 07/036,175, filed on Apr. 8, 1987, which is a continuation of application Ser. No. 06/726,975, now abandoned filed Jun. 25, 1985.

BACKGROUND OF THE INVENTION

This invention relates to a transporting system of floated carrier type and, more particularly, to a transporting system of floated carrier type, which includes a floating assembly for holding a carrier floated.

Heretofore, there have been known transporting systems for transporting articles which are comparatively light in weight and small in size such as semiconductor chips and documents.

One such transporting system is an airchute system, in which articles such as chips or documents are accommodated as cargo in a cylindrical capsule, which are pneumatically transported through a pipe to a predetermined position. In this airchute system, the cargo is accommodated in the form of a cylindrical or like mass in the cylindrical capsule when it is transported to predetermined positions. Therefore, punched cards, mark sheets, etc. cannot be transported by this system because they cannot be deformed into a cylindrical or like shape. In addition, when a cargo is being transported by the airchute system, mechanical shocks and noise will occur in the pipe.

Another well-known transporting system is a belt conveyor system. This system, however, has a low conveying speed and produces noise. Moreover, it requires a large space for installing a belt conveyor.

SUMMARY OF THE INVENTION

An object of the invention is to provide a transporting system of floated carrier type, which can reduce power consumed to float a carrier, does not produce as much noise and has a simple structure.

According to the invention, there is provided a transporting system for transporting cargo to a predetermined position, comprising:

a carrier for carrying cargo;

at least one rail extending along a running path of said carrier, said rail having a bottom section made of a ferromagnetic material;

floating means including a plurality of magnet units having respective combinations of permanent magnets and electromagnets provided on said carrier such as to face said rail, said carrier being caused to float with respect to said rail by electromagnetic attractive forces acting between said magnet units and the bottom section of said rail;

means provided on said carrier for sensing the gap between each said magnet unit and said rail to generate an output signal; and means for energizing said electromagnets by supplying a current thereto according to the output of said sensing means when an external force is applied to said carrier to prevent vertical motion of said carrier and holding the current supplied to said electromagnets to be substantially zero in a steady state of said carrier free from vertical motion.

BRIEF DESCRIPTION OF THE DRAWINGS

FIGS. 10 and 11 are block diagrams showing further improved processes of control of the floating assembly shown in FIG. 4B;

FIGS. 12 to 14 are detailed block diagrams showing further circuits for controlling the coil current in the floating assembly shown in FIG. 5.

DETAILED DESCRIPTION OF THE PREFERRED EMBODIMENTS

Now, an embodiment of the transporting system according to the invention will be described with reference to the FIGS. 1 to 3.

Figure 1:
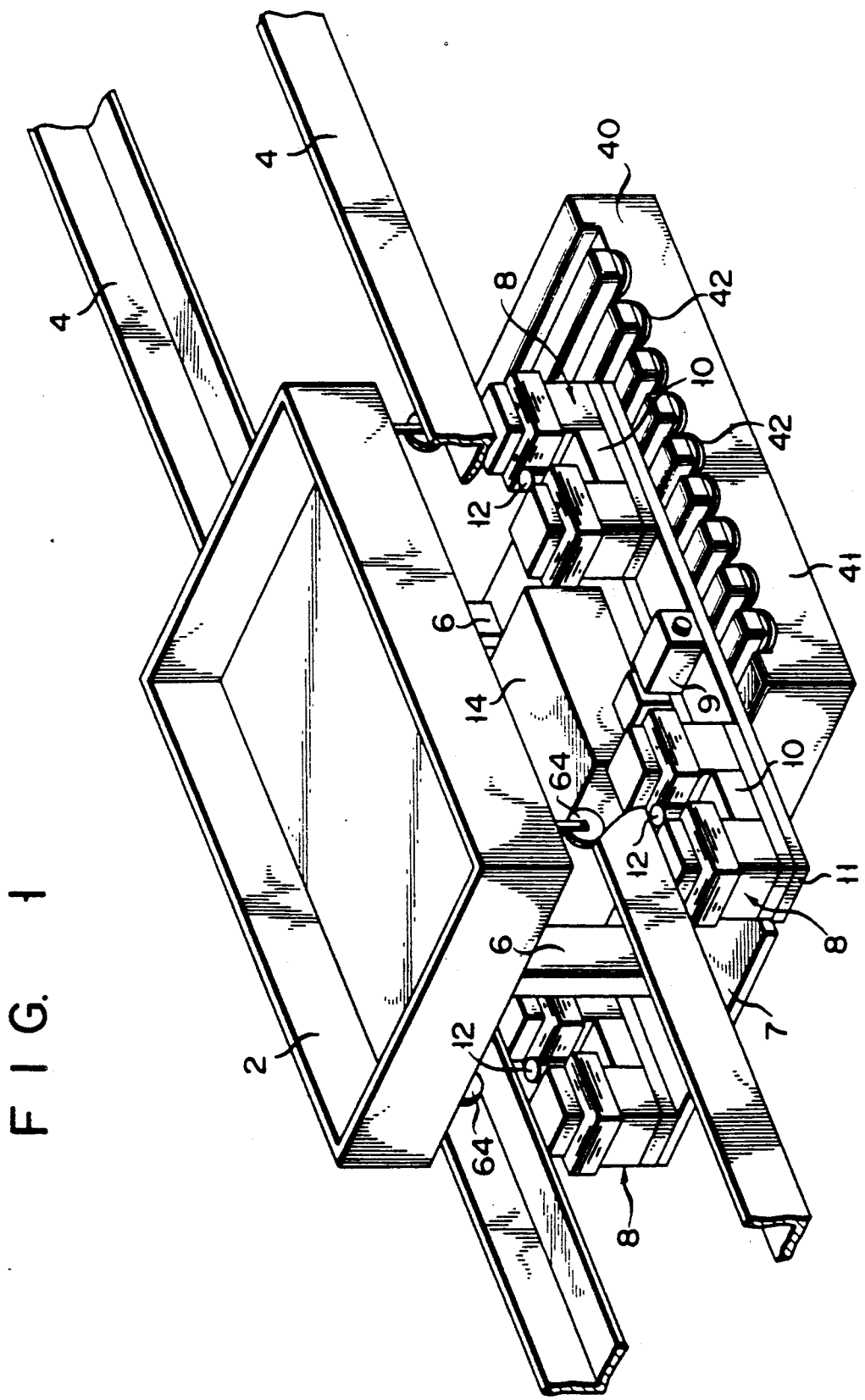
FIG. 1 is a perspective view showing an embodiment of the transporting system of floated carrier type according to the invention.
Figure 2:
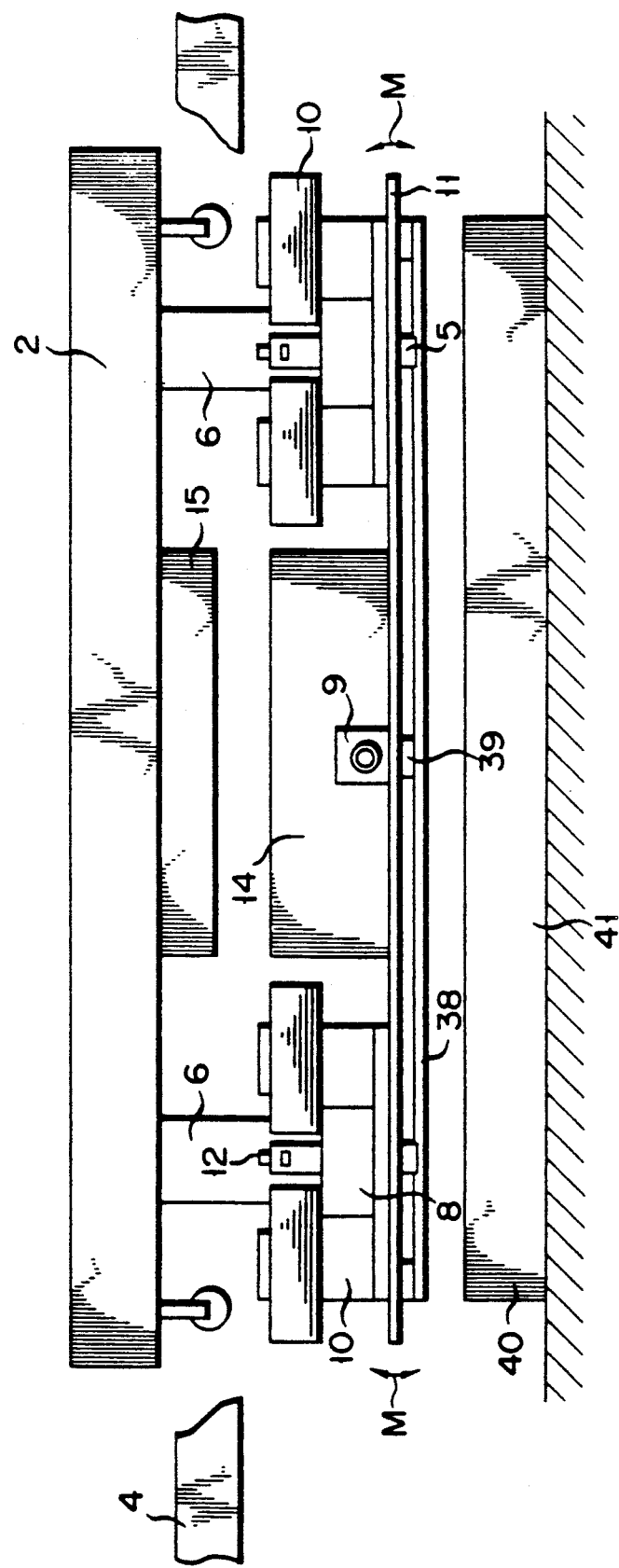
FIG. 2 is a side view, partly broken away, showing the transporting system of floated carrier type shown in FIG. 1.
Figure 3:
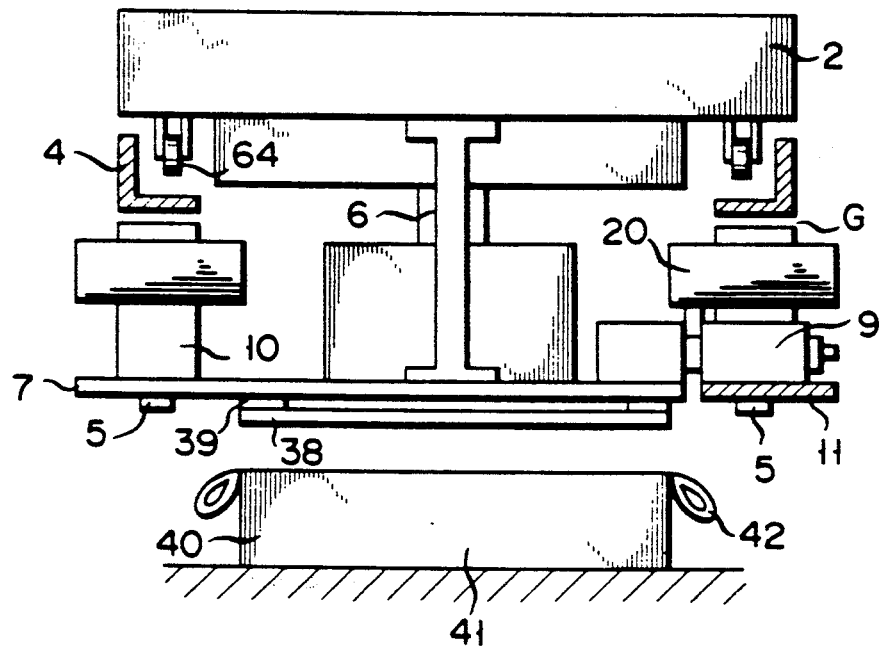
FIG. 3 is a front view, partly broken away, showing part of the transporting system shown in FIG. 1.
Figure 4A:
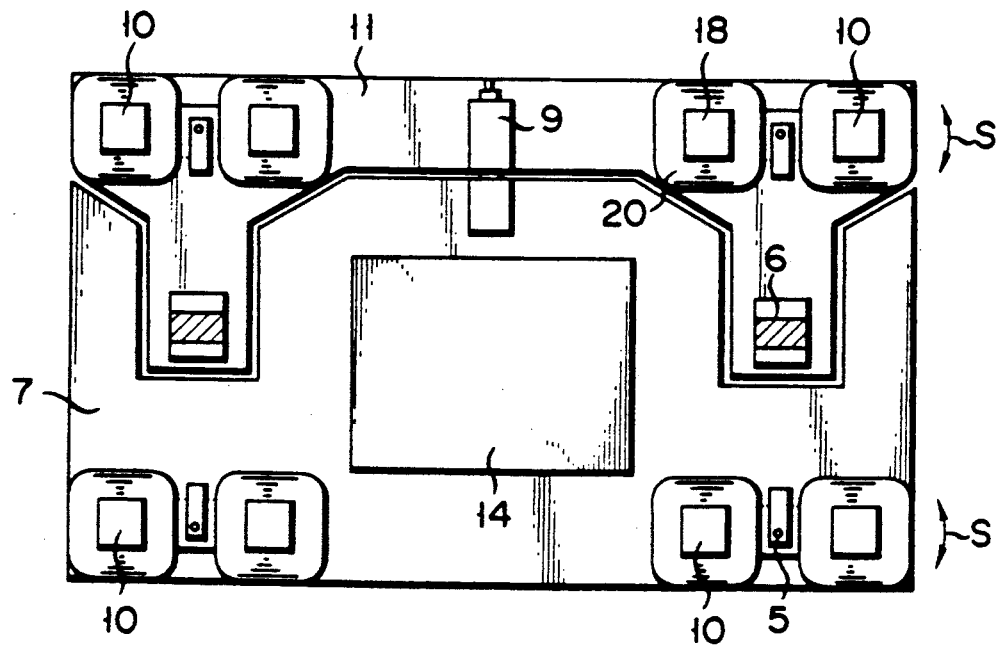
FIG. 4A is a plan view showing support plates and magnetic units supported thereon shown in FIG. 1.

Referring to FIGS. 1 to 3, there is shown a transporting system, in which a box-like carrier 2 which carries semiconductor chips or like cargo, runs along two L-shaped rails 4 extending along a path of transport of cargo. The rails 4 have bottom sections made of a ferromagnetic material or the rails 4 are made of a ferromagnetic material. The carrier 2, as shown in FIGS. 2 and 3 in detail, has a pair of columns 6, each of which downwardly extends from the bottom of the carrier 2. A first support plate 7 is secured to the other end of the columns 6. A second support plate 11 is coupled to the first support plate 7 by a coupling mechanism 9 serving as a bearing mechanism such that it can be turned with respect to the first support plate 7 in the directions of arrows M in FIG. 2. Four magnetic floating assemblies 8 are provided on the first and second support plates 7 and 11 such that they are located under the respective four corners of the carrier 2. As shown in FIG. 4A, the magnetic floating assemblies 8 are coupled to the first and second support plates 7 and 11 such that they can be rotated in the directions of arrows S around their shafts 5.

Figure 4B:
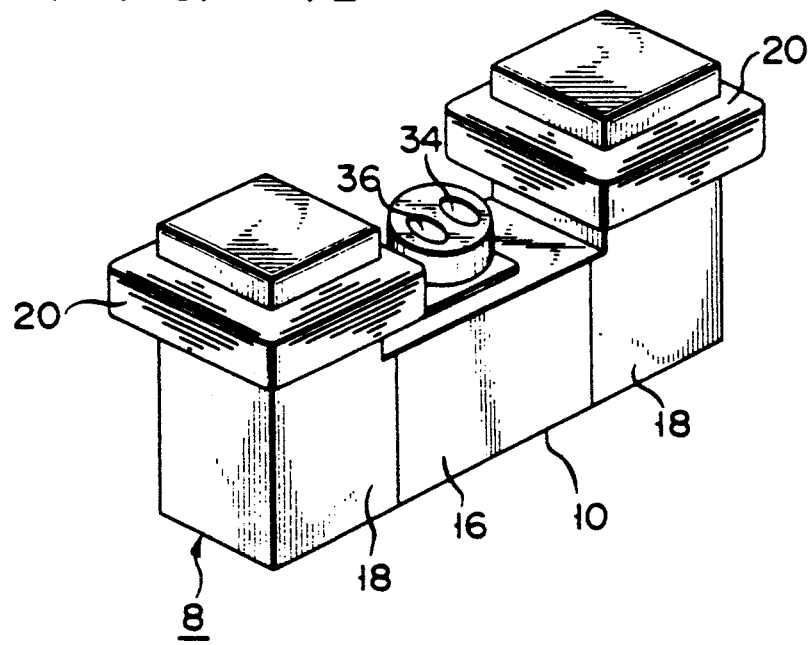
FIG. 4B is a perspective view, to an enlarged scale, showing the floating assembly shown in FIG. 1.
Figure 5:
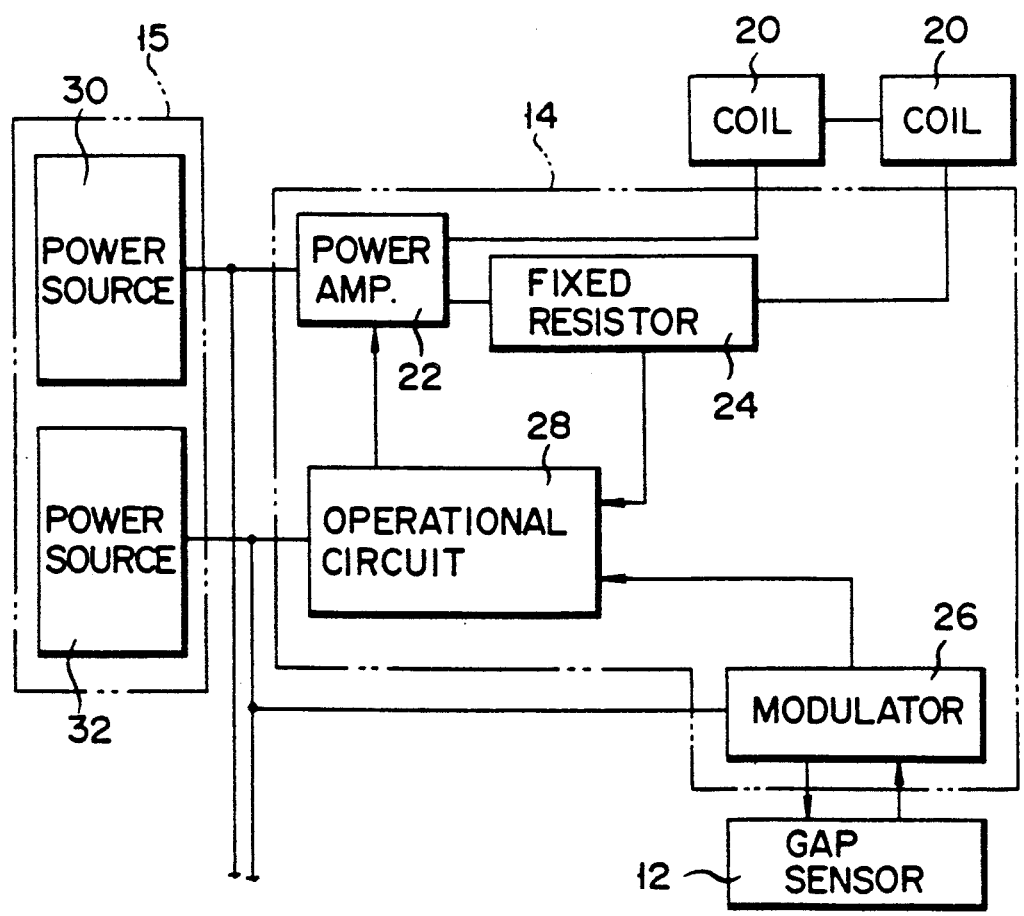
FIG. 5 is a block diagram showing a circuit for controlling current flowing through coils of floating assembly.

Each magnetic floating assembly 8 includes a magnet unit 10 which generates a force tending to cause the magnet unit 10 to be attracted to the rail 4. The assembly 8 also includes a gap sensor 12 which senses the gap G between the magnet unit 10 and rail 4. The carrier 2 also has a power source unit 15 mounted on its bottom. The carrier 2 further has a magnetic flux control unit 14, which is secured to the first support plate 7 and controls the intensity of the magnetic fields of the magnetic units 10. Each magnet unit 10, as shown in FIG. 4B, includes a permanent magnet 16, yokes 18 of a ferromagnetic material coupled to the front and rear ends of the permanent magnet 16 and coils 20 wound on the yokes 18. The magnetic units are provided on the first and second support plates 7 and 11 such that the top of the yokes 18 face the bottom of the rail 4. The permanent magnet 16 is capable of providing a magnetic energy, with which the carrier 2 can be held floated against the weight thereof and load thereon even without excitation of the coils 20 of the magnet units 10 so long as the system is in a stable state without any external disturbance applied. The gap sensor 12 is a photo-coupler type sensor which consists of a combination of a light-emitting element 34 for emitting a light beam toward the rail 4 and a light-receiving element 36 for detecting a light beam reflected from the rail 4. The gap sensor 12 is supported by the magnetic unit 10 such that its top, i.e., the light transmitting surface of the light-emitting element 34 and light receiving surface of the light-receiving element 36, faces the bottom of the rail 4. FIG. 5 shows the magnetic flux control unit 14. The unit 14 includes a power amplifier 22 connected to the coils 20 via a fixed resistor 24 for supplying current to the coils 20. It also includes a modulator 26 connected to the gap sensor 12. The modulator 26 generates a reference modulation signal fed to the gap sensor 12 and removes noise due to external light component from an output signal of the gap sensor 12. The modulator 26, fixed resistor 24 and power amplifier 22 are connected to an operational circuit 28, which performs an arithmetic operation on a voltage supplied through the fixed resistor 24 and the output of the modulator 26 to determine the amplification factor of the power amplifier 22. The power amplifier 22, operational circuit 28 and modulator 26 are connected to corresponding power sources 30 and 32.

As shown in FIGS. 1 to 3, a conductor plate 38 of aluminum, copper, etc. is secured via a spacer 39 to the underside of the first support plate 7. Beneath the rails, stator units 40 are provided along the rails 4 such that they can face the conductor plate 38. Each stator unit 40 includes a core 41 and three-phase coils 42 wound thereon. The coils are connected to a three-phase AC power source (not shown) via a switch (not shown).

In the floating assemblies 8 for floating the carrier 2 with respect to the rails 4, the magnetic units 10 are held attracted to the rails 4, i.e., the carrier 2 is secured to the rails 4, unless a current is supplied from the power source 30 carried by the carrier 2 to the coils 20. When a switch (not shown) is closed, a current is supplied from the power source 30 to the coils 20, while a current is also supplied from the power source 32 to the gap sensor 12. As a result, the coils 20 generate magnetic fluxes in the opposite direction to the magnetic fluxes generated by the magnet units 10. This has an effect of reducing a force tending to cause the magnet units 10 to be attracted to the rails 4, so that the magnet units 10 are separated from the rails 4, i.e., the carrier 2 is floated with respect to the rails 4. The magnetic flux control unit 14 controls the magnetic flux of the coils 20 such that the carrier 2 is held floated with respect to the rails 4 with a gap G formed between magnet unit 10 and rail 4. The light-emitting element 34 of the gap sensor 12 generates a modulated light beam according to the reference signal supplied through the modulator 26, as shown in FIG. 5, the emitted modulated light beem is reflected by the rail 4, and the light-receiving element 36 receives the reflected light beam. The gap sensor 12 thus generates an output corresponding to the intensity of the incident light beam. The modulator 26 removes noise from the output of the gap sensor 12, and its output free from noise is fed to the operational circuit 28. The intensity of the light beam detected by the light-sensitive element 36 varies in inverse relation to the square of the distance between the unit 10 and rail 4. This means that the output from the gap sensor 12 to the operational circuit 28 is determined by the distance between the magnet unit 10 and rail 4. If the detected gap or distance is greater than a predetermined distance, a control signal is supplied from the operational circuit 28 to the power amplifier 22 such as to increase the current through the coil 20. The amplification factor of the power amplifier 22 is thus increased to increase the current provided therefrom. If the detected distance is less than the predetermined distance, a control signal for reducing the current supplied to the coils 20 is supplied from the operational circuit 28 to the power amplifier 22 to reduce the amplification factor thereof, thus reducing current from the power amplifier 22. The current through the coils 20 is converted by the fixed resistor 24 into a corresponding voltage signal, which is fed as feedback signal to the operational circuit 28. That is, the magnetic flux produced from the magnet unit 10 is adjusted in accordance with the gap and the change of the attractive force produced by the magnet unit 10 so that the carrier 2 is floated at a good response. The attractive force produced by the magnet unit 10 is adjusted in accordance with the current supplied to the coils 20 and the gap so that the distance between the magnet unit 10 and rail 4 is held in a predetermined range irrespective of the weight of the cargo carried by the carrier 2 and other conditions.

The power source 30 supplies comparative high power to the power amplifier 22, while the power source 32 supplies comparatively low power to the gap sensor 12, etc. The power sources 30 and 32 supply power to all the four floating assemblies 8.

When the carrier 2 is caused to float, it is transported by a transporting mechanism of linear induction motor type. More specifically, when a power switch of the three-phase AC power source is closed, three-phase AC is applied from the three-phase AC power source to the three-phase coils of stator unit 40. A three-phase alternative shifting magnetic field is thus generated by the iron core 41 to induce current in the conductor plate 38. The conductor plate 38 is thus given a force in the direction of the shifting magnetic field by the interaction between the induced current and the magnetic field generated by the stator unit 40. As a result, the carrier 2 is given a propelling power. In the illustrated embodiment, obviously the resistance against the running of the carrier 2 is sufficiently low so long as the carrier 2 is floated so that only stator units 40 may be provided when necessary for propelling the carrier 2. For example, necessary numbers of stator units 40 may be provided at stations and curved sections of the running path.

When the carrier 2 is stopped at a station and the switch for the power sources 30 for supplying current to the coils 20 is opened, the magnet units 10 are attracted to the rails 4, that is, the carrier 2 is secured to the rails 4. At this time however, if the cargo carried by the carrier 2 is too heavy or if a downward force is applied to the carrier 2, it is likely that the magnet units 10 fail to be attracted to the rail 4 and the carrier 2 is lowered. In such case, four wheels 64 provided on the underside of the carrier 2 will protect the carrier 2 and cargo carried thereby.

Figure 6:
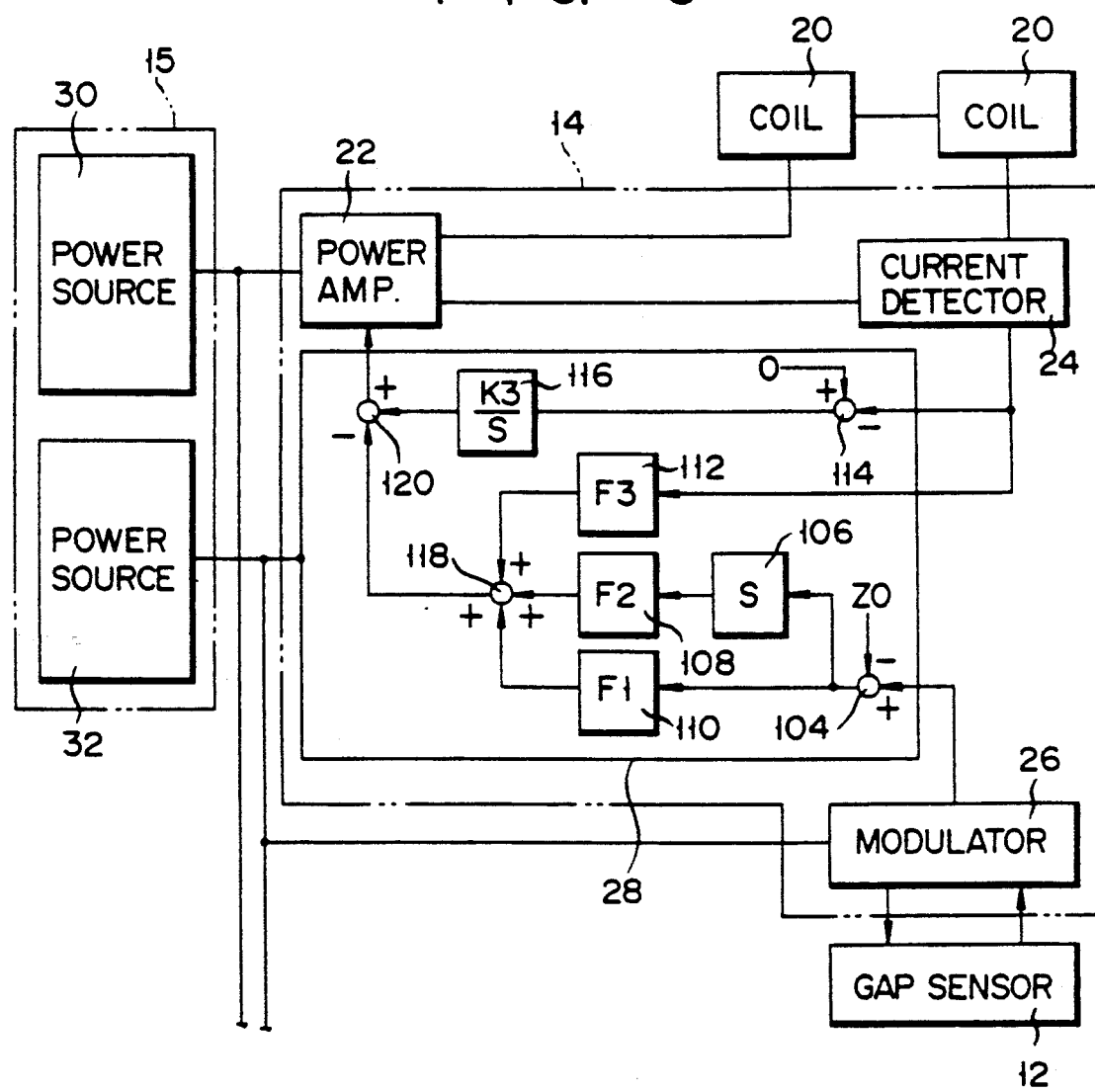
FIG. 6 is a detailed block diagram showing the circuit for controlling the coil current in the floating assembly shown in FIG. 5.

As mentioned before, the permanent magnets 16 in the magnetic floating assemblies are capable of providing a magnetic energy to have the carrier 2 floated against the weight thereof and load thereon even if the coils 20 of the magnet units 10 are not excited so long as the system is in a stable state without any external disturbance applied. Therefore, it must be that so long as the system is stable the current supplied to the coils 20 is held at zero level and the battery unit 15 is not consumed so much in general. However, in such case as when loading a cargo in the carrier 2 an external disturbance is applied to the system, and a force tending to force the carrier 2 back to the normal position has to be given from the magnet units 10 to the carrier. Unless current supplied to the magnet units 10 is adjusted by an appropriate control system, a large amount of current would be supplied to the magnet units 10 so that the battery unit 15 would soon be used up. This means that the battery unit 15 should have a large capacity. According to the invention a circuit as shown in FIG. 6 is adopted as an operational circuit in order to reduce power consumption by the battery unit 15 and reduce the size.

Figure 7:
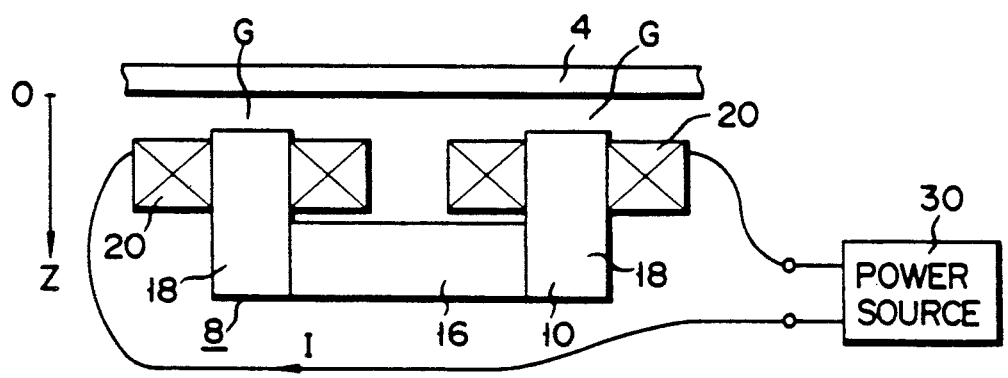
FIG. 7 is a schematic view for explaining the operational principles of the floating assembly shown in FIG. 4B.

Before describing the circuit shown in FIG. 6, the principles underlying a magnetic floating assembly control system according to the invention will be described with reference to FIG. 7 schematically illustrating the floating assembly.

In the transporting system according to the invention, the carrier 2 and cargo carried thereby are mainly supported by the magnetic forces of attraction acting between the permanent magnets 16 and rails 4. This means that the current supplied to the coils 20 of the magnet units 10 can be reduced very much compared to the floating assembly of the prior art transporting system. Since the current that has to be passed through the coils 20 is not so much and a small size power source can be used, the power sources 30 and 32 can be mounted on the carrier 2 as described above. Since the magnetic floating assembly 8 thus need not be supplied with current from the outside of the carrier 2, the transporting system according to the invention can be simplified compared to the prior art transporting system of floated carrier type.

Rail 4, gap G and yokes 18 and permanent magnet 16 of a magnet unit 10 constitute a magnetic circuit of the floating assembly, which will now be considered with reference to FIG. 7. For the sake of simplicity, the leakage flux in the magnetic circuit is ignored. The magnetic reluctance Rm of the magnetic circuit is given as $$Rm = \frac{1}{\mu_0 S}\left(2z + \frac{l}{\mu_s}\right) \quad (1)$$

where S is the sectional area of the magnetic circuit, z is the length of the gap, $\mu_s$ is the permeability of the other portion of the magnetic circuit than the gap, and l is the length of the other portion of the magnetic circuit than the gap.

The total magnetic flux $\phi$ generated by the magnetic circuit is given as $$\phi = (NI + Hmlm)/Rm \quad (2)$$

where Hm is the intensity of magnetic field in the gap G when there is no exciting current through the coils 20, m is the length of the permanent magnet 16, N is the total number of turns of the coils 20 and I is the exciting current through the coils 20. Thus, the total forces of attraction acting between the rail 4 and yokes 18 is $$\begin{aligned} F &= -S(\phi/S)^2/\mu_0 \\ &= \frac{-(NI + Hmlm)^2}{\mu_0 Rm^2 S} \end{aligned} \quad (3)$$

Denoting the direction of the gravitational force by z, we have a following equation of motion of the carrier:

$$m\frac{d^2z}{dt^2} = -\frac{(NI + Hmlm)^2}{\mu_0 Rm^2 S} + mg + Um \quad (4)$$

where m is the total mass of the load applied to the magnetic floating assemblies and the weight thereof, g is the gravitational acceleration and Um is the magnitude of the external force applied to the carrier.

Since the number $\phi_N$ of flux lines linking with the coils 20 connected in series is $$\phi_N = (NI + Hmlm)N/Rm \quad (5)$$

denoting the total resistance of the coils 20 by R we have, as a voltage equation for the coils 20, $$\frac{d\phi_N}{dt} = E - RI \quad (6)$$

$$\frac{\partial \phi_N}{\partial I} \cdot \frac{dI}{dt} + \frac{\partial \phi_N}{\partial z} \cdot \frac{dz}{dt} = E - RI$$

$$\frac{N^2}{Rm} \cdot \frac{dI}{dt} - \frac{2N}{\mu_0 SRm^2}(NI + Hmlm) \cdot \frac{dz}{dt} = E - RI$$

$$\frac{N^2}{Rm} \cdot \frac{dI}{dt} + RI = \frac{2N}{\mu_0 SRm^2}(NI + Hmlm) \cdot \frac{dt}{dt} + E$$

In the above equation, Rm is a function of the gap length z as is obvious from the equation 1. Denoting the gap length in a state of balance between the attraction force F and gravitation force mg when the current I is I=0 by z and the total magnetic reluctance by Rm, the equations 5 and 6 are linearized in the neighborhood of conditions of a gap length z of z=z₀, a speed dz/dt of dz/dt=0 and a current I of I=0. At this time, z, dz/dt and I are expressed as $$z = z_0 + \Delta z$$

$$\frac{dz}{dt} = 0 + \dot{\Delta z}$$

$$I = 0 + \Delta i$$

where $\Delta z$, $\dot{\Delta z}$, and $\Delta i$ are their infinitesimal quantities.

Thus, the attraction force F given by the equation 3 is linearized in the neighborhood of a stationary point (z, dz/dt, I)=(z₀, 0, 0) as $$F = (F)(z,0.0) + \left(\frac{\partial F}{\partial z}\right)(z_0,0,0)\Delta z + \left(\frac{\partial F}{\partial I}\right)(z_0,0,0)\Delta i$$

$$= -\frac{\mu_0 S H m^2 l m^2}{\left(2z_0 + \frac{l}{\mu_s}\right)^2} + \frac{4\mu_0 S H m^2 l m^2}{\left(2z_0 + \frac{l}{\mu_s}\right)^3} \Delta z -$$

$$\frac{2\mu_0 S H m l m N}{\left(2z_0 + \frac{l}{\mu_s}\right)^2} \Delta i$$

By setting $$F_0 = \frac{\mu_0 S H m^2 l m^2}{\left(2z_0 + \frac{l}{\mu_s}\right)^2} = mg$$

we have $$F = -mg + \frac{4mg}{Rm_0} \Delta z - \frac{2Nmg}{Hmlm} \Delta i$$

Hence, the equation 4 can be expressed as $$\Delta\ddot{z} = \frac{4g}{\mu_0 Rm_0 S} \Delta z - \frac{2gN}{Hmlm} \Delta i + \frac{1}{m} Um \quad (7)$$

Likewise, the equation 6 can be linearized in the neighborhood of a stationary point (z, dz/dt, I)=(z₀, 0, 0) as $$\Delta\dot{i} = \frac{2Hmlm}{N\mu_0 Rm_0 S} \Delta\dot{z} - \frac{R(Hmlm)^2}{N^2 mg\mu_0 Rm_0 S} \Delta i + \frac{(Hmlm)^2}{N^2 mg\mu_0 Rm_0 S} E \quad (8)$$

The equations 7 and 8 can be expressed as the following $$\frac{d}{dt}\begin{pmatrix}\Delta z \\ \Delta\dot{z} \\ \Delta i\end{pmatrix} = \begin{pmatrix}0 & 1 & 0 \\ a_{21} & 0 & a_{23} \\ 0 & a_{32} & a_{33}\end{pmatrix}\begin{pmatrix}\Delta z \\ \Delta\dot{z} \\ \Delta i\end{pmatrix} + \begin{pmatrix}0 \\ 0 \\ b_{31}\end{pmatrix} E + \begin{pmatrix}0 \\ d_{21} \\ 0\end{pmatrix} Um \quad (9)$$

where a₂₁, a₂₃, a₃₂, a₃₃, b₃₁, d₂₁ are $$a_{21} = \frac{4g}{\mu_0 Rm_0 S}, \quad a_{23} = -\frac{2gN}{Hmlm}, \quad a_{32} = \frac{2Hmlm}{N\mu_0 Rm_0 S},$$

$$a_{33} = \frac{R(Hmlm)^2}{N^2 mg\mu_0 Rm_0 S}, \quad b_{31} = \frac{(Hmlm)^2}{N^2 mgl_0 Rm_0 S}, \quad d_{21} = \frac{1}{m}$$

For the sake of simplicity, the equation 9 is expressed as $$\dot{x} = Ax + BE + DUm \quad (10)$$

The linear system expressed by the equation 9 is generally an instable system. However, the system can be stabilized by finding the applied voltage E from the state vector Δz, Δż, Δi and acceleration Δ¨z in the equation 9 by various methods and by being feedback controlled in accordance with the voltage. For example, if the applied voltage E is expressed as $$E = -[F_1, F_2, F_3] \times C \times x \quad (11)$$
$$= -FCx$$

where C is an output matrix (a unit matrix in this case) and F₁, F₂ and F₃ are feedback constants, the equation 10 reduces to $$\dot{x} = Ax - BFCx + DUm \quad (12)$$

Solving the equation 10 for X by Laplace transformation, $$x = L^{-1}\{[SI-A+BFC]^{-1}(x_0+DUm_{(s)})\} \quad (13)$$

where I is a unit matrix and x₀ is the initial value of x.

If Um in the equation 13 is an external force applied step-wise, the stability of x can be ensured when all the characteristic roots of the determinant det |φ(s)| of a state transition matrix φ(s) given as $$\phi_{(s)} = (SI-A+BFC)^{-1} \quad (14)$$

are present on the left half of the complex plane of operator s. In the case of the equation 9, the characteristic equation det |φ(s)|=0 of φ(s) is $$s^3 + (b_{31}F_3 - a_{33})s^2 + \{-a_{21} + a_{23}(b_{31}F_2 - a_{32})\}s + a_{23}b_{31}F_1 - a_{21}(b_{31}F_3 - a_{33}) = 0 \quad (15)$$

Figure 8:
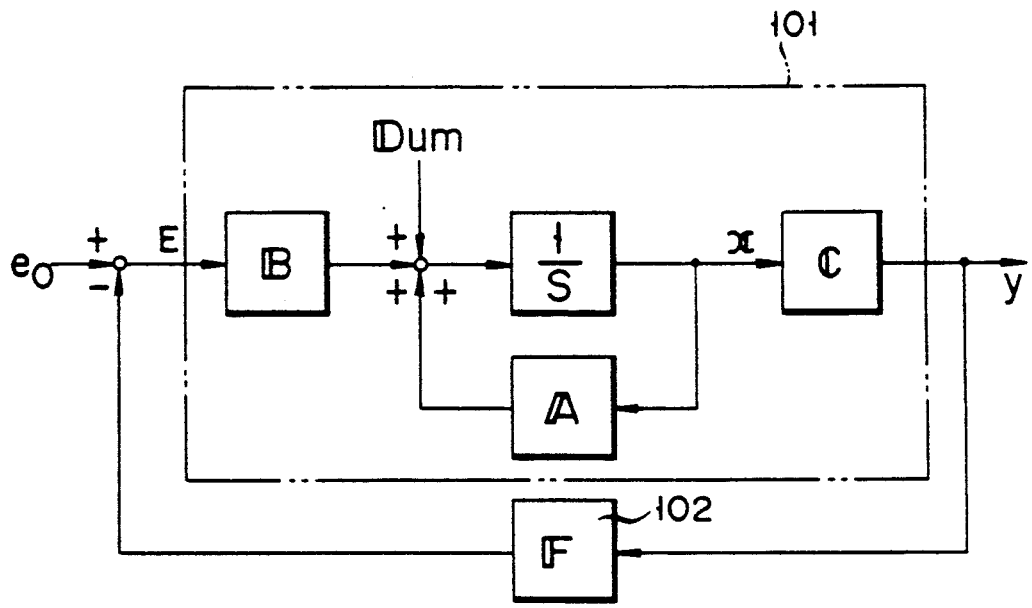
FIG. 8 is a block diagram showing a process of control of the floating assembly shown in FIG. 4B.

Thus, by suitably determining the values of F₁, F₂ and F₃ the positions of the characteristic roots of det |φ(s)|=0 on the complex plane can be determined as desired to stabilization of the magnetic floating assembly. The block diagram of FIG. 8 shows a feedback system for feedback controlling the magnetic floating assembly under the principles discussed above. In this instance, a feedback gain compensator 102 is added to the controlled system 101. In the Figure, y represents Cx.

In the magnetic floating system as discussed above, changes in the step-wise external force Um and bias voltage e0 of the applied voltage E cause the following steady deviations Δz_s and Δi_s from the gap length deviation Δz and current deviation Δi in the stable state of the system, respectively.

$$\Delta z_s = \frac{-d_{21}(-a_{33} + b_{31}F_3)Um - b_{31}a_{32}e^0}{a_{21}\left(-a_{33} + b_{31}F_3 - \frac{a_{23}}{a_{21}}b_{31}F_1\right)} \quad (16)$$

$$\Delta i_s = \frac{d_{21}b_{31}F_1 Um + b_{31}a_{21}e^0}{a_{21}\left(-a_{33} + b_{31}F_3 - \frac{a_{23}}{a_{21}}b_{31}F_1\right)} \quad (17)$$

According to the invention, the coils 20 are feedback controlled and the current steady deviation Δi_s among the steady deviations expressed by the equations 16 and 17 is made zero irrespective of whether there is any step-wise external force Um.

The current steady deviation Δi_s is controlled to zero, for instance, by the following methods.

(1) External force Um is monitored by a monitor, and the floating assembly, i.e., the coils 20, is feedback controlled with a suitable gain provided to the observed value of Um.

(2) The gap length deviation $\Delta z$, speed deviation $\Delta \dot{z}$ and current deviation $\Delta i$ are provided with suitable gains which are not all zero, and these gains are fed back to the magnetic floating assembly through a filter which constitutes a primary system of operator s.

(3) The current deviation $\Delta i$ is integrated by using an integrating compensator, and the output thereof is fed with a suitable gain provided to it to the magnetic floating assembly.

(4) The methods (1), (2) and (3) are appropriately combined.

The method (3) will now be described in detail as a typical example.

Figure 9:
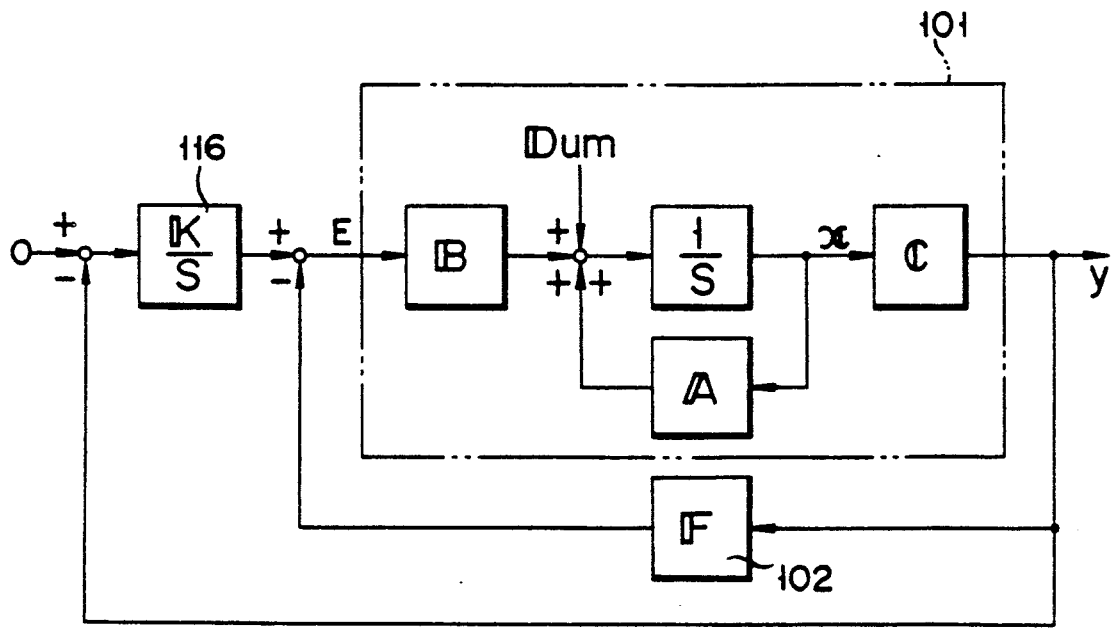
FIG. 9 is a block diagram showing an improved process of control of the floating assembly shown in FIG. 4B.

The block diagram of FIG. 9 illustrates a control process of a magnetic floating assembly adopting the method (3). In this instance, an integrating compensator 103 is added along with feedback gain compensator 102 to the controlled system. The gain K of the integrating compensator 103 is a matrix given as $K=[0, 0, K_3]$ where $K_3$ is the integral gain of the current deviation $\Delta i$. Thus, the applied voltage E in this magnetic floating system is given as $$E = -F \times C - KC \int_0^t \times dt \quad (18)$$

The state transition matrix $\phi_{(s)}$ is obtained in the manner as described before as $$\phi_{(s)} = (s^2 I - sA + sBFC + BKC)^{-1} \quad (19)$$

The transfer function G(s) when an external force Um is received and y given as $y = Cx$ is provided, is expressed as $$G_{(s)} = \frac{1}{\Delta_{(s)}} \begin{cases} \{s^2 + (b_{31}F_3 - a_{33})s + b_{31}K_3\} d_{21} \\ \{s^2 + (b_{31}F_3 - a_{33})s + b_{31}K_3\} sd_{21} \\ -\{(b_{31}F_2 - a_{32})s + b_{31}F_1\} sd_{21} \end{cases} \quad (20)$$

$$\Delta_{(s)} = s^4 + (b_{31}F_3 - a_{33})s^3 + \{b_{31}K_3 - a_{21} + \quad (21)$$

$$a_{23}(b_{31}F_2 - a_{32})\}s^2 + \{a_{23}b_{31}F_1 - a_{21}(b_{31}F_3 - a_{33})\}s - a_{21}b_{31}K_3$$

The characteristic roots of the transfer function G(s) can be obtained by setting $\Delta_{(s)}$ in the equation 21 to $\Delta_{(s)} = 0$, and stabilization of the magnetic floating system shown in FIG. 9 can be realized by suitably selecting $F_1, F_2, F_3$ and $K_3$.

If the illustrated magnetic floating assembly feedback system is stable, the response of the current deviation $\Delta i$ to the external force Um can be obtained using the Laplace transformation as $$\Delta i_{(s)} = -\frac{d_{21}}{\Delta_{(s)}} \{(b_{31}F_2 - a_{32})s + b_{31}F_1\} s Um_{(s)} \quad (22)$$

The external force Um in the equation 22 is a stepwise external force, so we have $$Um(s) = F_0/s$$

where $F_0$ is the magnitude of the external force. Hence the equation 22 reduces to $$\Delta i_{(s)} = -\frac{d_{21}}{\Delta_{(s)}} \{(b_{31}F_2 - a_{32})s + b_{31}F_1\} F_0 \quad (23)$$

The equation 23 guarantees $$\lim_{t \to \infty} \Delta i \to 0$$

Thus, it is obvious that the current steady deviation $\Delta i_s$ can be made closer to zero irrespective of whether there is any external force Um.

The individual elements of the state vector x may be determined, for instance, by the following methods.

(1) The individual elements are measured directly using suitable sensors.

(2) The output signal of either a suitable gap sensor, speed sensor or acceleration sensor as desired is integrated by an integrator or differentiated by a differentiator, thus obtaining the gap length deviation $\Delta z$, speed deviation $\Delta \dot{z}$, etc.

(3) Two elements of the state vector are detected by the method (1) or (2), and the remaining element is observed, if necessary, along with the external force Um with a monitor.

FIG. 6 shows a magnetic floating assembly feedback system, in which an operational circuit 28 derives the gap length deviation $\Delta z$ and speed deviation $\Delta \dot{z}$ from sensor output signal by the method (2) noted above. In the operational circuit 28, a subtractor 104 is connected to a modulator 26. The subtractor 104 is also connected through an differentiator 106 to a second feedback gain compensator 108, and it is further connected directly to a first feedback gain compensator 110. A current sensor 24, which is a fixed resistor for sending the current supplied to coils 20, is connected to a third feedback gain compensator 112. The first, second and third feedback gain compensators 110, 108 and 112 are connected to an adder 118 having an output optional connected to a first order filter 119. To the current sensor 24 is connected a subtractor 114, to which is in turn connected an integral compensator 116. The adder 118/filter 119 and integral compensator 116 are connected to a subtractor 120, which is in connected to a power amplifier 22 via a first order filter (not shown).

In the above magnetic floating assembly feedback system, stabilization of the control system is achieved as follows.

In the magnetic floating assembly 8, each permanent magnet 16 forms with the associated yokes 18, gap G and ferromagnetic part of rail 4 a closed magnetic circuit. In the steady state of the carrier 2 without any external force applied, the magnetic circuit is generating a magnetic force of attraction such that no flux from the electromagnet 20 is necessary to maintain a predetermined length $z_0$ of the gap G.

When an external force Um is applied in this state, the gap sensor 12 senses the force Um and produces a detection signal which is fed through the modulator 26 to the operational circuit 28. In the operational circuit 28, the subtractor 104 subtracts a preset gap length value $z_0$ from the value of the detection signal to produce a gap length deviation signal $\Delta z$. The gap length deviation signal $\Delta z$ is fed to the first feedback gain compensator 110, and it is also fed to the differentiator 106 for conversion to a speed deviation signal $\Delta \dot{z}$ which is fed to the second feedback gain compensator 108. Meanwhile, the current detector 24 produces a current deviation signal $\Delta i$ which is fed to a third feedback gain compensator 112. The subtractor 114 compares the current deviation signal $\Delta i$ to zero level, and its output difference signal is fed to the integral compensator 116. The adder 118 adds together the output signals of the three feedback gain compensators 108, 110 and 112. The subtractor 120 subtracts the output signal of the adder and output signal of the integral compensator 116 and the substracted signal is supplied as a feedback signal to the power amplifier 48. The system is thus stabilized in the state, in which the current deviation $\Delta i$ is zero.

It should be understood that with this embodiment the coils 20 carry current only in a transient state which results from a variation of the magnetic circuit due to an external force applied to the carrier 2, and in the steady state the coil current is zero irrespective of whether there is an external force applied. Thus, it is possible to greatly reduce the load of the power source and permit energy saving and space reduction.

Figure 12:
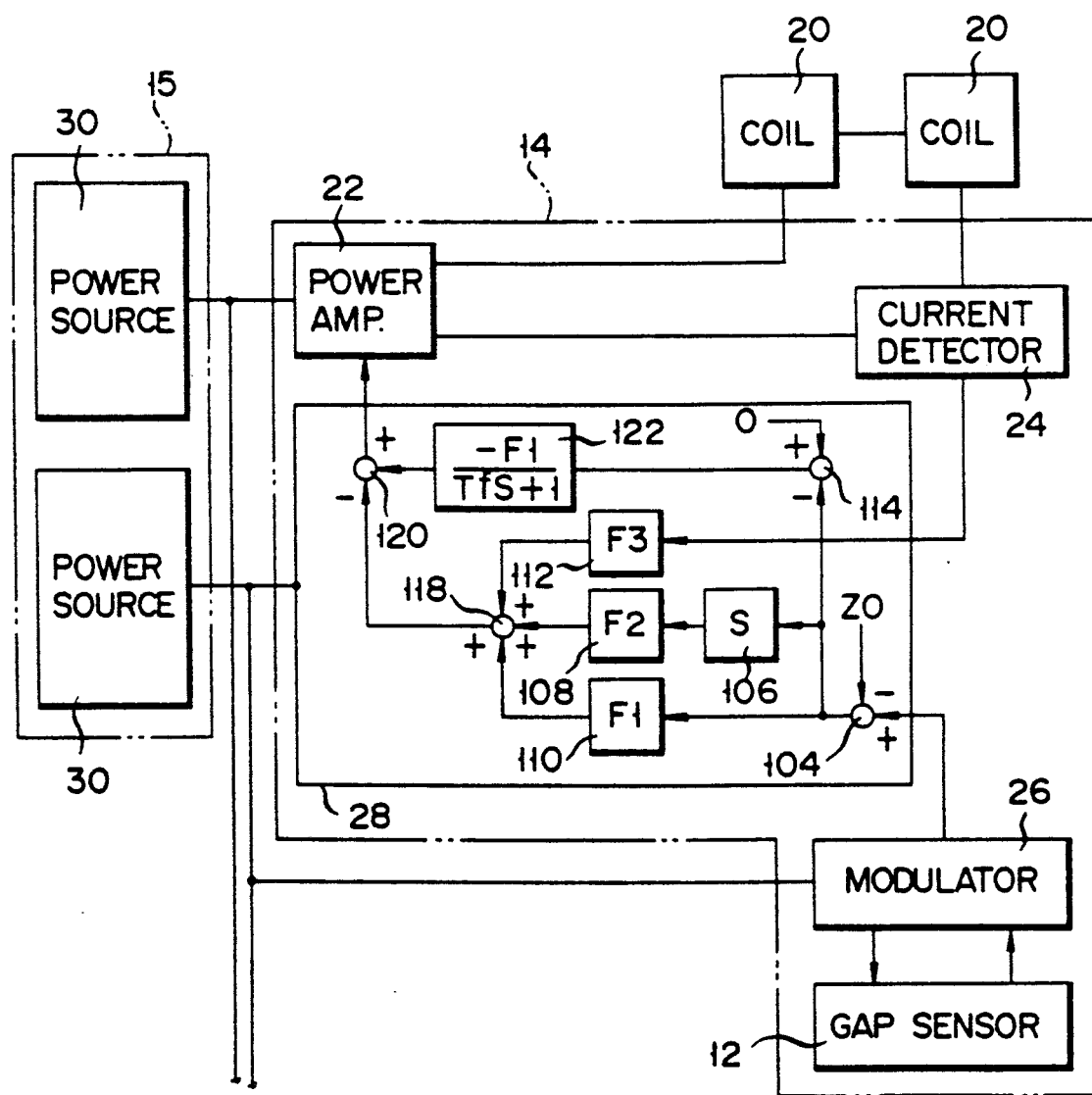

The above embodiment is by no means limitative. For example, while in the above embodiment the current deviation $\Delta i$ is integrated by the integral compensator and the output thereof is fed back with an appropriate gain, it is also possible to adopt control systems as shown in FIGS. 10 and 11. The control system shown in FIG. 10 is specifically constituted by an operational circuit shown in FIG. 12. In the control system shown in FIG. 10 and in the operational circuit shown in FIG. 12, integral compensators 103 and 116 are provided in lieu of the transfer function $G_f(s)$. The transfer function $G_f(s)$ is defined as $$G_f(s) = \frac{-F_1}{T_f s + 1}$$

where $T_f$ is the time constant of the filter. In the operational circuit 28 shown in FIG. 12, unlike the operational circuit shown in FIG. 6, subtractor 114 is not connected to current detector 24 but is connected to subtractor 104 and gap deviation signal $\Delta z$ therefrom is fed to subtractor 114. In FIG. 10, $\hat{p}$ is $\hat{p} = [-F\ 0\ 0]$.

Figure 13:
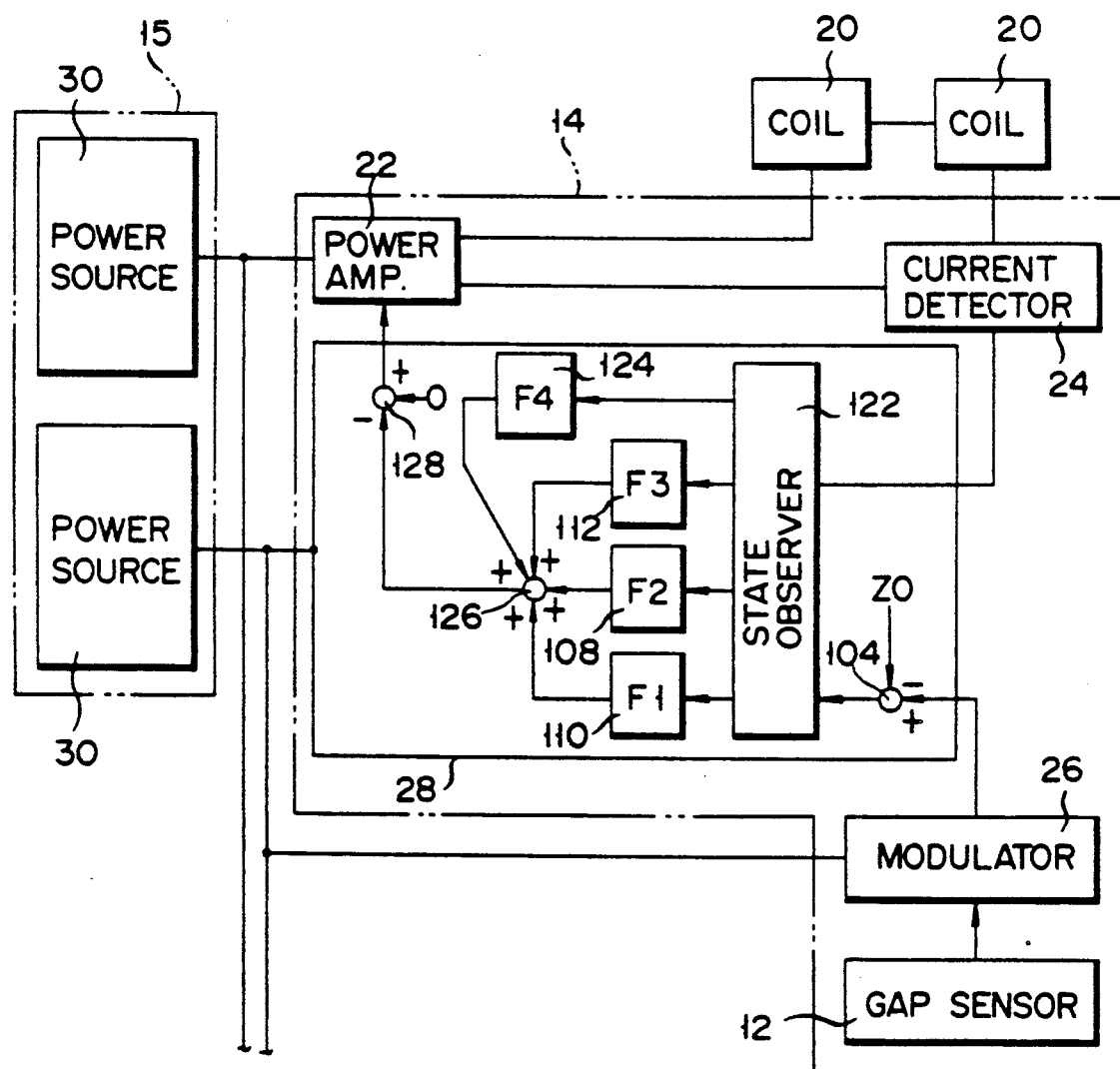

The control system shown in FIG. 11 uses a state observer 122 as noted above. Specifically, it is constituted by an operational circuit 28 as shown in FIG. 13. In the operational circuit 28 shown in FIG. 13, output signals from subtractor 104 and current sensor 24 are fed to the state observer 122. The observer 122 detects the speed $\Delta \dot{z}$ corresponding to the output of the differentiator shown in FIG. 6 and a steady component of external force Um fed to the carrier 2 and produces a gap deviation signal, a speed signal and a current deviation signal, these signals being fed to respective feedback compensators 112, 108, 110 and 124. The feedback compensators 112, 108, 110 and 124 respective produce outputs which are products of their inputs by respective gains $F_1$, $F_2$, $F_3$ and $F_4$. An adder 118 adds together these outputs, and a subtractor 120 compares the output of the adder 118 to zero signal to produce a difference signal which is fed to a power amplifier 22. The gain $F_4$ is given as $$F_4 = \frac{d_{21}}{a_{21}} F_1$$

Constants in the system shown in FIG. 9 are given as $$\hat{A} = \begin{bmatrix} -a_{11} & d_{21} \\ -a_{21} & 0 \end{bmatrix} \quad \hat{B} = \begin{bmatrix} a_{21} + d_{21}a_{21} - a_{11}^2 & a_{23} \\ -a_{11}a_{21} & 0 \end{bmatrix}$$

$$\hat{C} = \begin{bmatrix} 0 & 1 & 0 & 0 \\ 0 & 0 & 0 & 1 \end{bmatrix}^T \quad \hat{D} = \begin{bmatrix} 1 & a_{11} & 0 & a_{21} \\ 0 & 0 & 1 & 0 \end{bmatrix}^T$$

$$\hat{C}' = \begin{bmatrix} 1 & 0 & 0 \\ 0 & 0 & 1 \end{bmatrix} \quad \hat{F} = [F_1\ F_2\ F_3\ F_4]$$

$$y' = [\Delta z\ \Delta \dot{z}]^T$$

where $a_{11}$ and $a_{21}$ are constants which can be suitably determined such that the characteristic roots s of det $|SII - \overline{A}| = 0$ are found on the left half of the complex plane.

According to the invention, the gap sensor 12 and current sensor 24 may be replaced with a speed sensor and an acceleration sensor. FIG. 14 shows a further embodiment, in which an acceleration sensor 130 and to integrators 132 and 134 are used in lieu of the gap sensor 12. In this instance, the output of the acceleration sensor is integrated twice to detect the gap length between the yokes 20 and rail 4. This arrangement permits the setting of the sensor at a position in a range, in which the acceleration of the magnet unit 10 can be detected.

Further, the invention is not limited to the analog type control system, but according to the invention it is possible to construct a system with a digital type control element.

As has been described, according to the invention a portion corresponding to the magnetic force necessary to the electromagnet is compensated for by a permanent magnet, and the steady exciting current through the electromagnet is made zero irrespective of whether there is an external force applied to the carrier, so that the coils of the electromagnet carry only a transient current when an external force is applied to the carrier. Thus, according to the invention it is possible to greatly reduce power consumed by the coils and alleviate the load of the power source, which greatly contributes to energy saving.

Further, since the load of the power source can be alleviated in the above way, the capacity of the power source mounted on the carrier can be reduced. The possibility of using a reduced-size light-weight power source contributes to the reduction of installation space.

According to the invention the second support plate 11 is rotatably coupled to the first support plate 7, and a pair of magnet units 10 are mounted on each of the support plates such that they can be rotated about their shafts 5 in connection with the zero power control. Thus, if there occur errors of the flatness of the guide rails 4 or changes in the center of the gravity of the carrier 2 while the carrier 2 is being transported in the floated state to a destination, the second support plate 11 is rotated with respect to the first support plate 7 about the coupling mechanism 24 to maintain a proper gap length of the magnetic floating unit 8. Thus, the magnet units 10 generate magnetic forces of attraction in balance with the weight supported by the magnetic floating assemblies 8, and a proper gap is ensured between the magnetic floating assemblies 8 and guide rails 4 at all time. For this reason, even in case when the center of the gravity of the carrier is changed by partial loading of cargo in the carrier or the rails 4 are distorted when they are laid, the zero power control will not be spoiled for the gap length between the four magnetic floating assemblies 8 and rails 4 can be automatically controlled to a proper value. More specifically, the coils 20 of the magnetic floating assemblies 8 carry only a transient current that would be produced with a change in the magnetic circuit caused by an external force applied to the carrier 2, and in the steady state the coil current is zero irrespective of whether there is an external force. Thus, it is possible to greatly alleviate the load of the power source and permit energy saving and installation space reduction.

Further, with the magnetic floating assemblies 8 installed on the carrier 2 such that they are rotatable in a horizontal plane, it is possible to permit the carrier to proceed along a curved portion of rails with a small radius of curvature. Also, with the magnetic floating assemblies 8 mounted such that they are rotatable both in the horizontal and vertical directions as in the above embodiment, it is possible to permit the carrier 2 to pass through a cant provided along a curved portion of the rails 4. It is thus possible to increase the speed of the carrier running along the curved portion of rails and reduce the transportation time.

The above embodiment of the invention is by no means limitative, and can be variously modified. For example, FIGS. 15 to 18 show different arrangements of magnetic floating assemblies 8 and coupling mechanisms 9, the assemblies and mechanisms being provided in different numbers in these examples.

Figure 15:
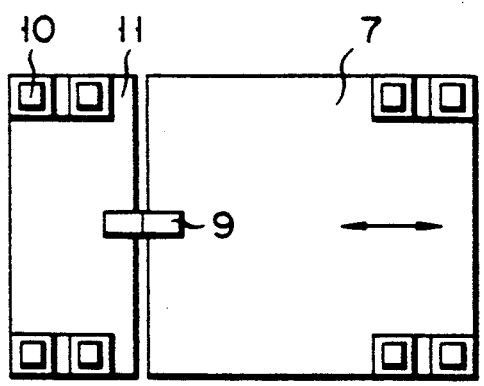
FIGS. 15 to 18 are plan views showing examples of the arrangement of support plates and magnet units shown in FIG. 1.
Figure 16:
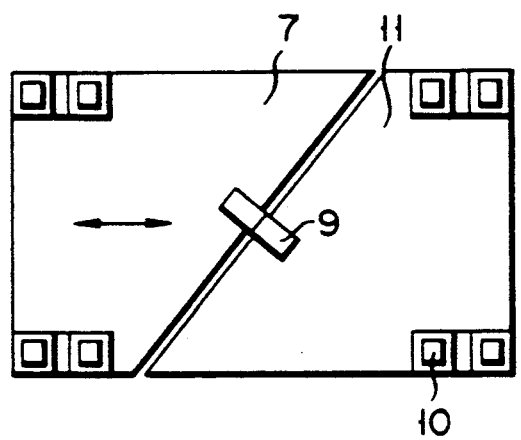
Figure 17:
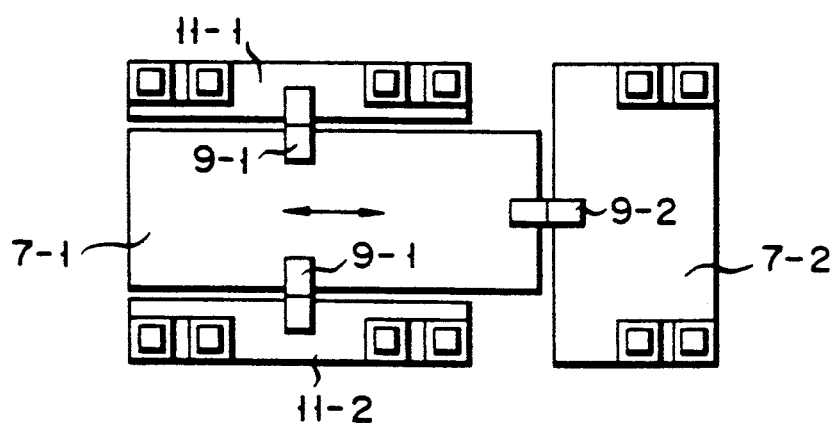
Figure 18:
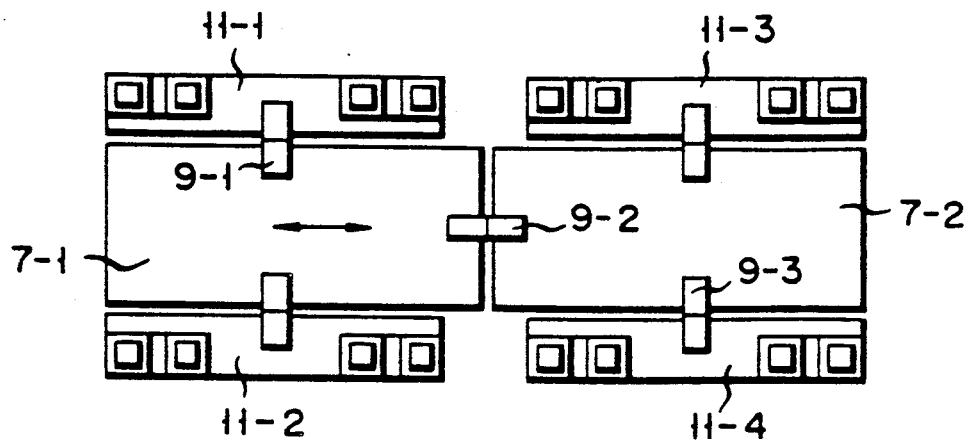

More specifically, in the example of FIG. 15 first and second support plates 7 and 11 are coupled together with that they are rotatable with respect to each other in a plane perpendicular to the direction of progress of the carrier (i.e., direction of arrow). In the example of FIG. 16, first and second support plates 7 and 11 are coupled together such that they are rotatable with respect to each other in a plane normal to a direction at an angle of 45° to the direction of progress of the carrier (i.e., direction of arrow). The number of magnetic floating assemblies 8 is not limited to four. The example of FIG. 17 uses six magnetic floating assemblies 8, three thereof being provided along each rail. In this example, two pairs of magnetic floating assemblies 8 adjacent to each other in the direction of progress of the carrier are supported by respective support plates 11-1 and 11-2, and the remaining pair of magnetic floating assemblies 8 adjacent to the aforementioned magnetic floating assemblies 8 in the direction of progress of the carrier is supported by a further support plate 7-2. The support plates 11-1 and 11-2 are coupled by respective coupling mechanisms 9-1 to the support plate 7-1, to which the carrier is secured, and the support plates 7-1 and 7-2 are coupled together by a coupling mechanism 9-1. In this case, the carrier is stably supported at three points by the three coupling mechanisms 9-1, 9-2 and 9-3. The example of FIG. 18 uses eight magnetic floating units 8. In this example, adjacent two magnetic floating assemblies 8 along each rail are supported by each of four support plates 11-1, 11-2, 11-3 and 11-4. The support plates 11-1 and 11-2 are coupled by the coupling mechanisms 9-1 to the opposite sides of the support plate 7-1, to which the carrier is secured, and the support plates 11-3 and 11-4 are coupled by coupling mechanisms 9-3 to the opposite sides of the support 7-2. The support plates 7-1 and 7-2 are coupled together by a coupling mechanism 9-2.

By increasing the number of magnetic floating assemblies 8 the burden thereof can be alleviated that much to increase capacity of transportation. In this case, the carrier may be stably supported by securing it to two support means for supporting magnetic floating assemblies or securing it in a plurality of divisions to respective support means.

According to the invention, the support means are not limited to plate members, but it is also possible to use rod-like members. Further, the invention is not limited to a system using reflecting type photocouplers as gap sensors, but the same effects can be obtained by using other optical or magnetic gap sensors.

Various changes and modifications thus can be made without departing from the scope of the invention.

According to the invention, the weight of the carrier and cargo is distributed over all the magnetic floating assemblies when the carrier is held floated. Thus, it is possible to balance the load applied to all the magnetic floating assemblies and the attraction force of the individual permanent magnet irrespective of partial loading of cargo in the carrier and errors of the flatness of the rails, and power consumption by the electromagnets can be greatly reduced. Thus, according to the invention the load of the power source can be reduced to greatly contribute to energy saving.

Further, since the load of the power source can be alleviated in the above way, the capacity of the power source mounted on the carrier can be reduced, so that a reduced-size light-weight power source can be used, which constitutes to the reduction of installation source.

Further, since according to the invention the load applied to all the magnetic floating assemblies and attraction force of the individual permanent magnets can be balanced to one another, it is possible to use an increased number of magnetic floating assemblies as desired. Therefore, an increase of the weight of the cargo can be coped with by using an increased number of magnetic floating assemblies to permit the weight of the cargo be distributed over the attraction forces of the increased number of permanent magnets, thereby alleviating the burden on one magnetic floating assembly. It is thus possible to increase the load capacity per carrier.

Moreover, according to the invention errors of the flatness of guide rails, if any, can be absorbed by the displacement of the magnetic floating assemblies, so that it is possible to provide a curved portion of guide rails with cant. The provision of cant can cope with an increase of the speed of the carrier running along the curved rail portion to improve the speed of the carrier and reduce the transportation time.

What is claimed is:

1. A transporting system for transporting cargo to a predetermined position, comprising:
   a carrier for carrying cargo;
   at least one rail extending along a running path of said carrier and having a bottom section made of a ferromagnetic material;
   floating means including a plurality of magnetic units having respective combinations of permanent magnets and electromagnets provided on said carrier such as to face said rail, said carrier being caused to float with respect to said rail by electromagnetic attractive forces acting between said magnets and the bottom section of said rail, each of said magnetic units comprising two faces which are located opposite the bottom section of said rail, each magnetic unit producing a magnetic flux which emerges from one of said faces and extends through a gap to the bottom section of said rail, passes through said bottom section, and returns to the magnetic unit through a gap between the bottom section and the other face;

means for sensing a gap between each said magnetic unit and said rail to generate an output signal;

means for generating an exciting current;

means for energizing said electromagnets by supplying the exciting current thereto according to the output of said sensing means to maintain said carrier in a stable floating condition, the exciting current supplied to said electromagnet being controlled to be substantially zero during a steady state in which all external forces applied to said carrier are overcome and said carrier is maintained in said stable floating condition; and means coupled to said carrier, for supporting said magnets to allow the gaps between said magnets and said rail to be changed, independently.

2. The transporting system according to claim 1, wherein said sensing means includes a light-emitting element for emitting a light beam toward said rail and a light-receiving element for generating a signal corresponding to the intensity of the received light beam reflected by said rail, said intensity being related to the gap.

3. The transporting system according to claim 1, wherein said sensing means includes a sensor for sensing the acceleration of said carrier when said carrier undergoes a vertical motion and generates an output corresponding to the sensed acceleration.

4. The transporting system according to claim 1, which further comprises means for sensing a current applied to said electromagnets.

5. The transporting system according to claim 1, which further comprises means for propelling said carrier including a conductor plate provided on said carrier and a plurality of stator units disposed along said rail such as to give a shifting magnetic field to said conductor plate, said carrier being given a propelling power by electromagnetic forces acting between a magnetic flux set up by current induced in said conductor plate by said shifting magnetic field and flux generated by said stator units.

6. The transporting system according to claim 5, wherein said conductor plate extends from the bottom of said carrier and said plurality of stator units face said conductor plate.

7. The transporting system according to claim 1, wherein said energizing means includes means for generating an exciting current, a state observer for determining the magnitude of said external forces from an output signal of said sensing means, and means for feeding back the magnitude of external force determined by said state observer with a predetermined gain to said exciting current generating means.

8. The transporting system according to claim 1, wherein said energizing means includes means for feeding back deviation of the gap length between said electromagnets and said guide rail with a predetermined gain to said exciting current generating means and feeding back the deviation of the gap length through a filter having a first order transfer function with a gain being the same magnitude as that of the predetermined gain to said exciting current generating means.

9. The transporting system according to claim 1, wherein said energizing means includes an integral compensator for integrating said exciting current deviation with a predetermined gain and means for feeding back the output of said integral compensator to said exciting current generating means.

10. The transporting system according to claim 1, wherein a value detected by said sensing means is at least one of the gap between said electromagnets and said guide rail, the speed change of said carrier, the acceleration change of said carrier and exciting current supplied to said electromagnets.

11. The transporting system according to claim 10, wherein said magnetic units are capable of being rotated in a plane parallel to the underside of said rail.

12. A transporting system for transporting cargo to a predetermined position, comprising:

a carrier for carrying cargo;

at least one rail extending along a running path of said carrier and having a bottom section made of a ferromagnetic material;

floating means including a plurality of magnetic units having respective combinations of permanent magnets and electromagnets provided on said carrier such as to face said rail, said carrier being caused to float with respect to said rail by electromagnetic attractive forces acting between said magnets and the bottom section of said rail, each of said magnetic units comprising two faces which are located opposite the bottom section of said rail, each magnetic unit producing a magnetic flux which emerges from one of said faces and extends through a gap to the bottom section of said rail, passes through said bottom section, and returns to the magnetic unit through a gap between the bottom section and the other face;

means for sensing a gap between each said magnetic unit and said rail to generate an output signal;

means for generating an exciting current;

means for energizing said electromagnets by supplying the exciting current thereto according to the output of said sensing means to maintain said carrier in a stable floating condition, the exciting current supplied to said electromagnet being controlled to be substantially zero during a steady state in which all external forces applied to said carrier are overcome and said carrier is maintained in said stable floating condition; and means coupled to said carrier, for supporting said magnets to allow the gaps between said magnets and said rail to be changed, independently;

wherein said supporting means comprises a first support plate provided with at least one of said magnetic units secured to said carrier such that it extends along said rail, a second support plate extending along said first support plate and provided with at least one of said magnetic units, and means for rotatably coupling said second support plate to said first support plate.

* * * * *